United States Patent
Mitsuta et al.

(10) Patent No.: US 12,516,422 B2
(45) Date of Patent: Jan. 6, 2026

(54) WATER ELECTROLYSIS SYSTEM AND METHOD OF ACTIVATING WATER ELECTROLYSIS DEVICE

(71) Applicant: HONDA MOTOR CO., LTD., Tokyo (JP)

(72) Inventors: Naoki Mitsuta, Wako (JP); Shuichiro Kojima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 818 days.

(21) Appl. No.: 17/731,269

(22) Filed: Apr. 28, 2022

(65) Prior Publication Data

US 2022/0356586 A1 Nov. 10, 2022

(30) Foreign Application Priority Data

May 6, 2021 (JP) .................................. 2021-078697

(51) Int. Cl.
*C25B 1/04* (2021.01)
*C25B 9/17* (2021.01)
(Continued)

(52) U.S. Cl.
CPC .................. *C25B 1/04* (2013.01); *C25B 9/17* (2021.01); *C25B 9/30* (2021.01); *C25B 9/65* (2021.01); *C25B 15/02* (2013.01); *C25B 15/08* (2013.01)

(58) Field of Classification Search
None
See application file for complete search history.

(56) References Cited

U.S. PATENT DOCUMENTS 11,505,872 B2 * 11/2022 Tanaka ...................... C25B 1/04
2004/0131902 A1 7/2004 Frank et al.
(Continued)

FOREIGN PATENT DOCUMENTS

CN 1444666 9/2003
JP 07-126883 5/1995
(Continued)

OTHER PUBLICATIONS

Japanese Notice of Allowance for Japanese Patent Application No. 2021-078697 mailed Oct. 4, 2022.
(Continued)

*Primary Examiner* — Luan V Van
(74) *Attorney, Agent, or Firm* — Amin, Turocy & Watson, LLP

(57) ABSTRACT

A water electrolysis system includes a water electrolysis cell, a power supply, an oxygen tank, and a control device. The water electrolysis cell has a solid polymer electrolyte membrane and an anode and a cathode provided on both sides of the solid polymer electrolyte membrane in a thickness direction. The water electrolysis cell electrolyzes water by applying a voltage between the anode and the cathode using the power supply. The control device makes the pressure of oxygen generated at the anode relatively higher than the pressure of hydrogen generated at the cathode according to the electrolysis of the water in the water electrolysis cell. The control device makes the pressure of the anode side of the solid polymer electrolyte membrane relatively higher than the pressure of the cathode side by supplying the oxygen from the oxygen tank to the anode before the electrolysis starts.

6 Claims, 7 Drawing Sheets

(51) Int. Cl.
*C25B 9/30* (2021.01)
*C25B 9/65* (2021.01)
*C25B 15/02* (2021.01)
*C25B 15/08* (2006.01)

(56) References Cited

U.S. PATENT DOCUMENTS

| | | | |
|---|---|---|---|
| 2009/0071819 A1 | 3/2009 | Rusta-Sallehy et al. | |
| 2011/0042228 A1 | 2/2011 | Hinatsu et al. | |
| 2012/0073962 A1 | 3/2012 | Haryu et al. | |
| 2012/0209434 A1* | 8/2012 | Kurashina | C25B 1/04 700/273 |
| 2015/0211132 A1* | 7/2015 | Mackinnon | C25B 1/04 204/252 |

FOREIGN PATENT DOCUMENTS

| | | | | |
|---|---|---|---|---|
| JP | 11-335883 | 12/1999 | | |
| JP | 2002-038287 | 2/2002 | | |
| JP | 2003-515237 | 4/2003 | | |
| JP | 2003-138391 | 5/2003 | | |
| JP | 2003-277963 | 10/2003 | | |
| JP | 2010-265494 | 11/2010 | | |
| JP | 2011-162880 | 8/2011 | | |
| JP | 2012-087403 | 5/2012 | | |
| JP | 2016-204698 | 12/2016 | | |
| JP | 2017-206730 | 11/2017 | | |
| WO | WO-2004027901 A2 * | 4/2004 | | C01B 3/0078 |
| WO | WO-2020162771 A1 * | 8/2020 | | C25B 1/04 |

OTHER PUBLICATIONS

Chinese Office Action for Chinese Patent Application No. 202210454724.8 mailed Feb. 27, 2025.

* cited by examiner

WATER ELECTROLYSIS SYSTEM AND METHOD OF ACTIVATING WATER ELECTROLYSIS DEVICE

CROSS-REFERENCE TO RELATED APPLICATION

Priority is claimed on Japanese Patent Application No. 2021-078697, filed May 6, 2021, the content of which is incorporated herein by reference.

BACKGROUND OF THE INVENTION

Field of the Invention

The present invention relates to a water electrolysis system and a method of activating a water electrolysis device.

Description of Related Art

In the related art, for example, a method of activating a water electrolysis system for limiting an increase rate of a current to be applied in a case where there is a high possibility that hydrogen will be retained on an anode side when a water electrolysis system having a solid polymer type water electrolysis cell is activated is known (see, for example, Japanese Unexamined Patent Application, First Publication No. 2017-206730). In this activation method, an increase in the concentration of hydrogen discharged together with oxygen generated at the anode is limited by limiting the increase rate of the current to be applied.

SUMMARY OF THE INVENTION

When a solid polymer type water electrolysis cell is provided as in the above-described water electrolysis system, oxygen and hydrogen may be mixed due to a crossover in which oxygen generated at an anode and hydrogen generated at a cathode permeate an electrolyte membrane. Because the purity of each of types of oxygen and hydrogen decreases and a problem such as deterioration of an electrolyte membrane occurs when the amount of crossover increases, it is desired to limit the mixing of oxygen and hydrogen.

Aspects according to the present invention have been made in consideration of such circumstances and an objective of the present invention is to provide a water electrolysis system and a method of activating a water electrolysis device capable of limiting the mixing of oxygen and hydrogen generated due to electrolysis of water.

In order to achieve the objective for solving the above-described problems, the present invention adopts the following aspects.

(1) According to an aspect of the present invention, there is provided a water electrolysis system including: a water electrolysis cell having an electrolyte membrane and an anode and a cathode provided on both sides of the electrolyte membrane in a thickness direction and configured to electrolyze water by applying a voltage between the anode and the cathode; a power supply configured to apply the voltage between the anode and the cathode; an oxygen supply source configured to supply oxygen to the anode; and a control device configured to make the pressure of oxygen generated at the anode relatively higher than the pressure of hydrogen generated at the cathode according to the electrolysis of the water in the water electrolysis cell and make the pressure of the anode side of the electrolyte membrane relatively higher than the pressure of the cathode side by supplying the oxygen from the oxygen supply source to the anode before the electrolysis starts.

(2) In the above-described aspect (1), the oxygen supply source may include an oxygen container configured to store oxygen generated at the anode according to the electrolysis of the water by the water electrolysis cell.

(3) In the above-described aspect (1), the water electrolysis system may include a first oxygen container configured to store at least a part of oxygen generated at the anode according to the electrolysis of the water by the water electrolysis cell, wherein the oxygen supply source may include a second oxygen container connected to a flow path branching from a flow path for connecting the water electrolysis cell and the first oxygen container and configured to store a part of the oxygen generated at the anode according to the electrolysis of the water by the water electrolysis cell.

(4) In the above-described aspect (3), the water electrolysis system may include a pressure acquisition unit configured to acquire the pressure of the oxygen in the second oxygen container, wherein the control device may preferentially supply oxygen generated at the anode after the start of the electrolysis to the second oxygen container over the first oxygen container and switch a supply destination of oxygen generated at the anode from the second oxygen container to the first oxygen container on the basis of the pressure acquired by the pressure acquisition unit.

(5) In the above-described aspect (3) or (4), the control device may switch the oxygen supply source from the second oxygen container to the first oxygen container when the pressure of the anode side is less than prescribed pressure in a state in which the oxygen is supplied from the second oxygen container to the anode.

(6) In any one of the above-described aspects (1) to (5), the water electrolysis system may include a water supply unit configured to supply the water to the cathode.

(7) According to an aspect of the present invention, there is provided a method of activating a water electrolysis device including a water electrolysis cell having an electrolyte membrane and an anode and a cathode provided on both sides of the electrolyte membrane in a thickness direction and configured to electrolyze water by applying a voltage between the anode and the cathode, a power supply configured to apply the voltage between the anode and the cathode, and electronic equipment, the method, which is executed by the electronic equipment, including steps of: making, by the electronic equipment, the pressure of oxygen generated at the anode relatively higher than the pressure of hydrogen generated at the cathode according to the electrolysis of the water in the water electrolysis cell; and making, by the electronic equipment, the pressure of the anode side of the electrolyte membrane relatively higher than the pressure of the cathode side by supplying the oxygen from the oxygen supply source to the anode before the electrolysis starts.

According to the above-described aspect (1), it is possible to limit the movement of hydrogen, which is more likely to permeate the electrolyte membrane than oxygen, from the cathode side to the anode side due to a difference in a magnitude of molecular weight by providing the control device that makes the pressure of the anode side of the electrolyte membrane relatively higher than the pressure of the cathode side even before the start of electrolysis of the water.

In the above-described aspect (2), the pressure of the anode side can be increased before the start of electrolysis of the water by the oxygen stored in advance in the oxygen container. For example, as compared with a case where the pressure of the anode side is boosted by supplying external oxygen and the like, it is possible to limit the complexity of a system configuration without the need to provide dedicated equipment for boosting.

In the above-described aspect (3), it is possible to increase the pressure of the anode side due to the oxygen supplied from the second oxygen container regardless of the residual pressure of the first oxygen container by providing the second oxygen container in addition to the first oxygen container configured to store the oxygen generated at the anode according to the electrolysis of the water. For example, even if the residual pressure of the first oxygen container is reduced before the start of the electrolysis of the water, the pressure of the anode side can be boosted by the oxygen stored in advance in the second oxygen container.

The second oxygen container is connected to the flow path branching from the flow path connecting the water electrolysis cell and the first oxygen container and therefore the oxygen generated at the anode after the start of electrolysis of water can be filled into the second oxygen container even if the residual pressure of the second oxygen container is reduced due to the boost in the pressure of the anode side before the start of the electrolysis of the water. By maintaining the residual pressure of the second oxygen container at a prescribed level or higher, the pressure of the anode side can be accurately boosted at the next activation time.

In the above-described aspect (4), it is possible to maintain the residual pressure of the second oxygen container accurately at a prescribed level or higher by providing the pressure acquisition unit configured to acquire the pressure of the oxygen in the second oxygen container. It is possible to limit the excessive supply of oxygen to the second oxygen container and efficiently supply the oxygen to the first oxygen container and the second oxygen container by providing the control device configured to switch the supply destination of the oxygen generated at the anode from the second oxygen container to the first oxygen container in accordance with the pressure of the oxygen stored in the second oxygen container.

In the above-described aspect (5), it is possible to increase the pressure of the anode side according to the oxygen supplied from the first oxygen container regardless of the residual pressure of the second oxygen container by providing the control device configured to switch the oxygen supply source from the second oxygen container to the first oxygen container when the boost in the pressure of the anode side by the second oxygen container is insufficient. For example, it is possible to boost the pressure of the anode side according to the oxygen stored in advance in the first oxygen container even if the residual pressure of the second oxygen container is reduced before the start of electrolysis of water.

In the case of the above-described aspect (6), for example, as compared with a case where water for electrolysis is supplied to the anode, it is possible to easily boost the pressure of the anode side by providing the water supply unit configured to supply water for electrolysis to the cathode according to a so-called cathode feed.

According to the above-described aspect (7), it is possible to limit the movement of hydrogen, which is more likely to permeate the electrolyte membrane than oxygen, from the cathode side to the anode side due to a difference in a magnitude of molecular weight by including the step of making the pressure of the anode side of the electrolyte membrane relatively higher than the pressure of the cathode side even before the start of electrolysis of the water.

DETAILED DESCRIPTION OF THE INVENTION

Hereinafter, a water electrolysis system and a method of activating the water electrolysis system according to embodiments of the present invention will be described with reference to the attached drawings.

Figure 1:
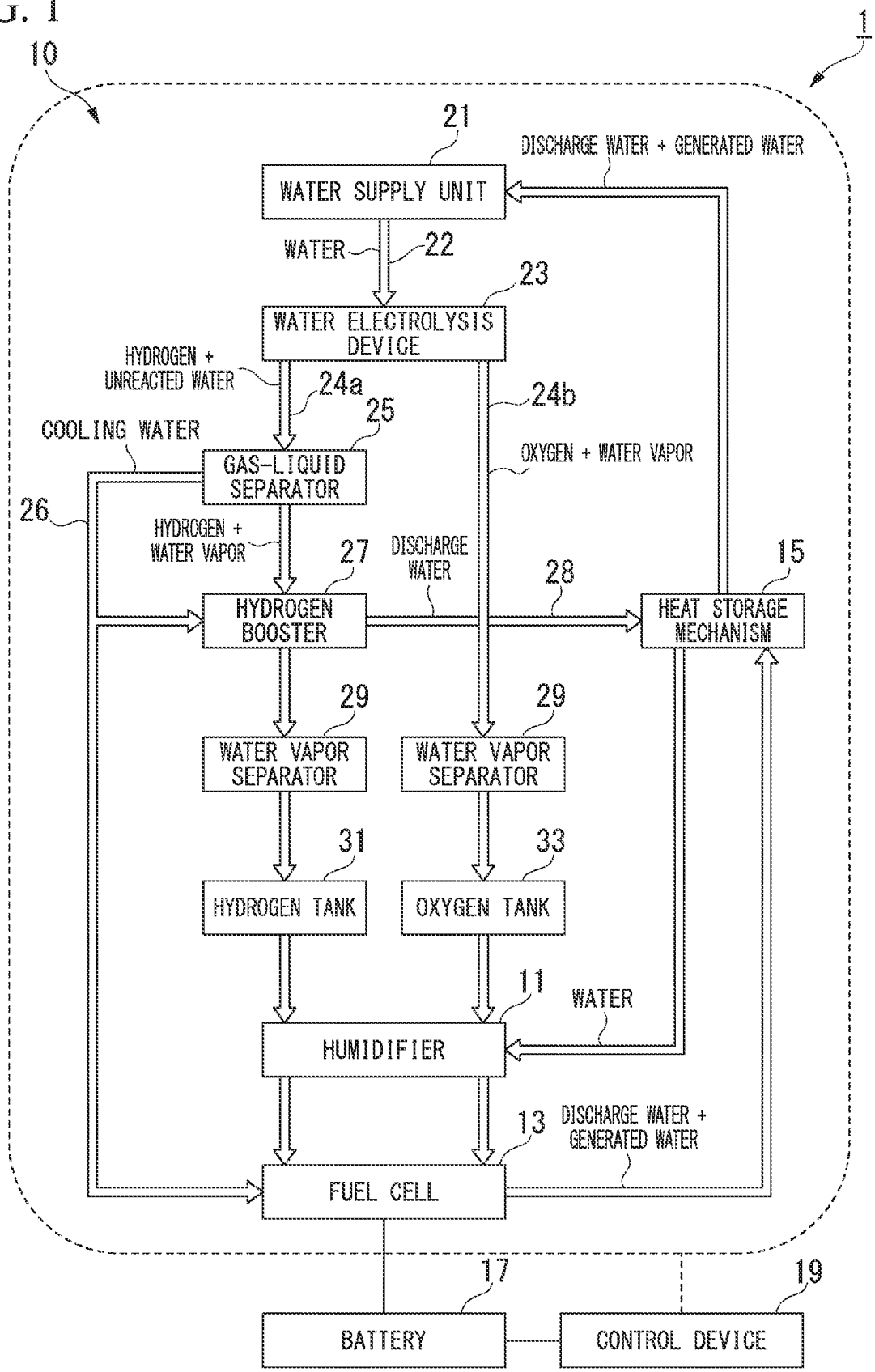
FIG. 1 is a diagram schematically showing a configuration of an energy system including a water electrolysis system according to an embodiment of the present invention.

FIG. 1 is a diagram schematically showing a configuration of an energy system 1 including a water electrolysis system 10 of the embodiment.

As shown in FIG. 1, the water electrolysis system 10 of the embodiment is provided in, for example, the energy system 1 that mutually utilizes electric power, heat, and water.

The energy system 1 includes, for example, a water electrolysis system 10, a humidifier 11, a fuel cell 13, a heat storage mechanism 15, a battery 17, and a control device 19. The battery 17 and the control device 19 constitute a part of the water electrolysis system 10.

The humidifier 11 humidifies hydrogen and oxygen supplied from the water electrolysis system 10 using water supplied from the heat storage mechanism 15 and supplies them to the fuel cell 13. The fuel cell 13 generates electricity through the catalytic reaction of hydrogen and oxygen supplied from the water electrolysis system 10. The heat storage mechanism 15 stores water (discharge water and generated water) supplied from the hydrogen booster 27 of the water electrolysis system 10 and the fuel cell 13 to be described below. The heat storage mechanism 15 supplies water for warming up at the time of activation to the water electrolysis system 10 and the fuel cell 13 to be described below. The heat storage mechanism 15 supplies water for humidification to the humidifier 11. The heat storage mechanism 15 supplies water for circulation to the water supply unit 21 of the water electrolysis system 10 to be described below.

The battery 17 stores electric power generated by the fuel cell 13 and the like.

The control device 19 controls the entire energy system 1 in an integrated way. The control device 19 is a software function unit that functions by executing a prescribed program using a processor such as a central processing unit (CPU). The software function unit is an electronic control unit (ECU) including a processor such as a CPU, a read-only memory (ROM) storing a program, a random-access memory (RAM) temporarily storing data, and an electronic circuit such as a timer. At least a part of the control device 19 may be an integrated circuit such as a large-scale integration (LSI) circuit.

The water electrolysis system 10 includes, for example, a water supply unit 21, a water supply flow path 22, a water electrolysis device 23, a hydrogen supply flow path 24a, an oxygen supply flow path 24b, a gas-liquid separator 25, a cooling water supply flow path 26, a hydrogen booster 27, a discharge water flow path 28, two water vapor separators 29, a hydrogen tank 31, and an oxygen tank 33.

The water supply unit 21 supplies water to the water electrolysis device 23 via the water supply flow path 22 provided between the water supply unit 21 and the water electrolysis device 23. The water supply unit 21 includes, for example, a pure water generator, a circulation pump, an ion exchanger, and the like. The pure water generator generates pure water from tap water or the like. The circulation pump sends water supplied from the pure water generator, the heat storage mechanism 15, and the like to the water electrolysis device 23. The ion exchanger removes impurities from the water supplied from the heat storage mechanism 15 and the like.

The water electrolysis device 23 is, for example, a solid polymer type water electrolysis device. The water electrolysis device 23 electrolyzes the water supplied from the water supply unit 21 via the water supply flow path 22. The water electrolysis device 23 supplies hydrogen generated due to electrolysis of water to the hydrogen tank 31 via the hydrogen supply flow path 24a provided between the water electrolysis device 23 and the hydrogen tank 31. The water electrolysis device 23 supplies oxygen generated due to electrolysis of water to the oxygen tank 33 via the oxygen supply flow path 24b provided between the water electrolysis device 23 and the oxygen tank 33.

The water electrolysis device 23 includes at least one water electrolysis stack. The water electrolysis stack includes a plurality of laminated water electrolysis cells 41 and a pair of end plates (not shown) that sandwich a laminate (a cell unit) of the plurality of water electrolysis cells 41 from both sides in a lamination direction.

Figure 2:
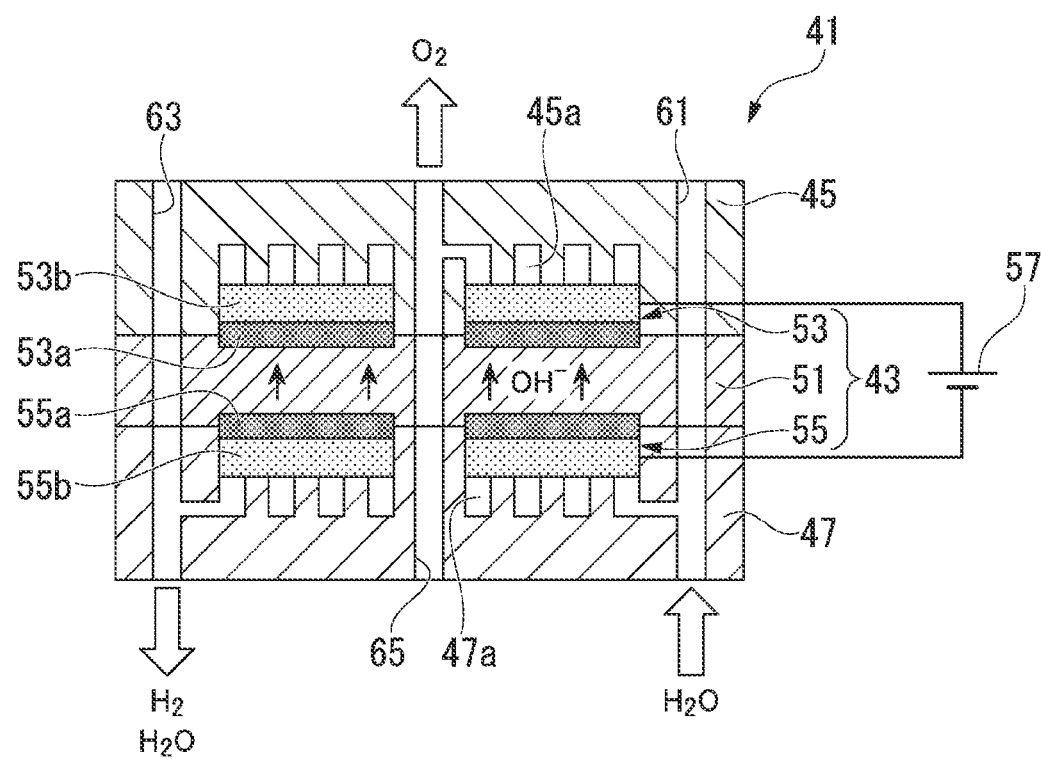
FIG. 2 is a cross-sectional view showing a configuration of a water electrolysis cell of a water electrolysis device according to the embodiment of the present invention.

FIG. 2 is a cross-sectional view showing a configuration of the water electrolysis cell 41 of the water electrolysis device 23 in the embodiment.

As shown in FIG. 2, the water electrolysis cell 41 includes an electrolyte electrode structure 43 and an anode-side separator 45 and a cathode-side separator 47 that sandwich the electrolyte electrode structure 43 from both sides in a thickness direction (i.e., the lamination direction of the cell unit).

The electrolyte electrode structure 43 includes a solid polymer electrolyte membrane 51 and an anode 53 and a cathode 55 that sandwich the solid polymer electrolyte membrane 51 from both sides in a thickness direction.

The solid polymer electrolyte membrane 51 includes, for example, an anion exchange membrane, a proton exchange membrane, or the like that selectively makes anions such as hydroxide ions ($OH^-$) conductive.

The anode 53 includes, for example, an anode catalyst 53a, a gas diffusion layer 53b which is a feeder, and the like.

The cathode 55 includes, for example, a cathode catalyst 55a, a gas diffusion layer 55b, which is a feeder, and the like.

The gas diffusion layer 53b, which is the feeder of the anode 53, and the gas diffusion layer 55b, which is the feeder of the cathode 55, are connected to, for example, a power supply 57 including a battery 17 or the like.

The anode-side separator 45 forms an anode-side flow path 45a between the anode-side separator 45 and the anode 53. The anode-side flow path 45a is formed, for example, by a concave groove formed on a surface of the anode-side separator 45 and a surface of the anode 53 covering an open end of the concave groove of the anode-side separator 45. The anode-side flow path 45a is connected to an oxygen discharge through-hole 65 to be described below.

The cathode-side separator 47 forms a cathode-side flow path 47a between the cathode-side separator 47 and the cathode 55. The cathode-side flow path 47a is formed by, for example, a concave groove formed on a surface of the cathode-side separator 47 and a surface of the cathode 55 covering an open end of the concave groove of the cathode-side separator 47. The cathode-side flow path 47a is connected to a water supply through-hole 61 and a hydrogen discharge through-hole 63 to be described below.

A water supply through-hole 61, a hydrogen discharge through-hole 63, and an oxygen discharge through-hole 65 penetrating in the lamination direction are formed in the water electrolysis stack 23a composed of a cell unit including a plurality of water electrolysis cells 41 and a pair of end plates.

The water supply through-hole 61 is connected to the water supply flow path 22 outside the water electrolysis device 23 and is connected to the cathode-side flow path 47a inside the water electrolysis device 23.

The hydrogen discharge through-hole 63 is connected to the hydrogen supply flow path 24a outside the water electrolysis device 23 and is connected to the cathode-side flow path 47a inside the water electrolysis device 23.

The oxygen discharge through-hole 65 is connected to the oxygen supply flow path 24b outside the water electrolysis device 23 and is connected to the anode-side flow path 45a inside the water electrolysis device 23.

The water electrolysis cell 41 electrolyzes water by supplying water to the cathode 55 using a so-called cathode feed and causing a current to flow through the anode 53 and the cathode 55 using the power supply 57.

The cathode 55 causes hydrogen and hydroxide ions to be generated by electrolyzing the water supplied from the water supply through-hole 61 to the cathode-side flow path 47a. The hydrogen generated at the cathode 55 is discharged from the cathode-side flow path 47a to the hydrogen discharge through-hole 63 together with unreacted water. The hydroxide ions generated at the cathode 55 make the solid polymer electrolyte membrane 51 conductive and move to the anode 53.

The anode 53 generates oxygen and water using hydroxide ions that have conducted electricity from the cathode 55 through the solid polymer electrolyte membrane 51. Oxygen and water generated at the anode 53 are discharged from the anode-side flow path 45a to the oxygen discharge through-hole 65.

As shown in FIG. 1, the gas-liquid separator 25 is arranged between the water electrolysis device 23 and the hydrogen booster 27 in the hydrogen supply flow path 24a. The gas-liquid separator 25 separates a fluid containing hydrogen and unreacted water discharged from the water electrolysis device 23 into gas components and a liquid component. The gas components include, for example, hydrogen and water vapor. The liquid component includes, for example, water.

The gas-liquid separator 25 discharges hydrogen and water vapor, which are the gas components obtained in gas-liquid separation, toward the hydrogen booster 27 via the hydrogen supply flow path 24a.

The gas-liquid separator 25 discharges the water of the liquid component obtained in the gas-liquid separation as cooling water toward the hydrogen booster 27 and the fuel cell 13 via a cooling water supply flow path 26 provided between the hydrogen booster 27 and the fuel cell 13.

The hydrogen booster 27 is arranged between the gas-liquid separator 25 and the water vapor separator 29 in the hydrogen supply flow path 24a. The hydrogen booster 27 is, for example, an electrochemical hydrogen compressor (EHC) that electrochemically compresses hydrogen. The hydrogen booster 27 boosts the pressure of the hydrogen supplied from the gas-liquid separator 25 and discharges the hydrogen whose pressure is boosted toward the water vapor separator 29 via the hydrogen supply flow path 24a.

The hydrogen booster 27 is cooled by the cooling water supplied from the gas-liquid separator 25 via the cooling water supply flow path 26. The hydrogen booster 27 discharges the cooled cooling water as discharge water toward the heat storage mechanism 15 via the discharge water flow path 28 provided between the hydrogen booster 27 and the heat storage mechanism 15.

The two water vapor separators 29 are arranged between the hydrogen booster 27 and the hydrogen tank 31 in the hydrogen supply flow path 24a and between the water electrolysis device 23 and the oxygen tank 33 in the oxygen supply flow path 24b. The water vapor separator 29 separates water vapor from a fluid containing each component of hydrogen and oxygen and water vapor, for example, according to cooling, moisture adsorption, or the like.

Each water vapor separator 29 discharges hydrogen toward the hydrogen tank 31 via the hydrogen supply flow path 24a or discharges oxygen toward the oxygen tank 33 via the oxygen supply flow path 24b.

Figure 3:
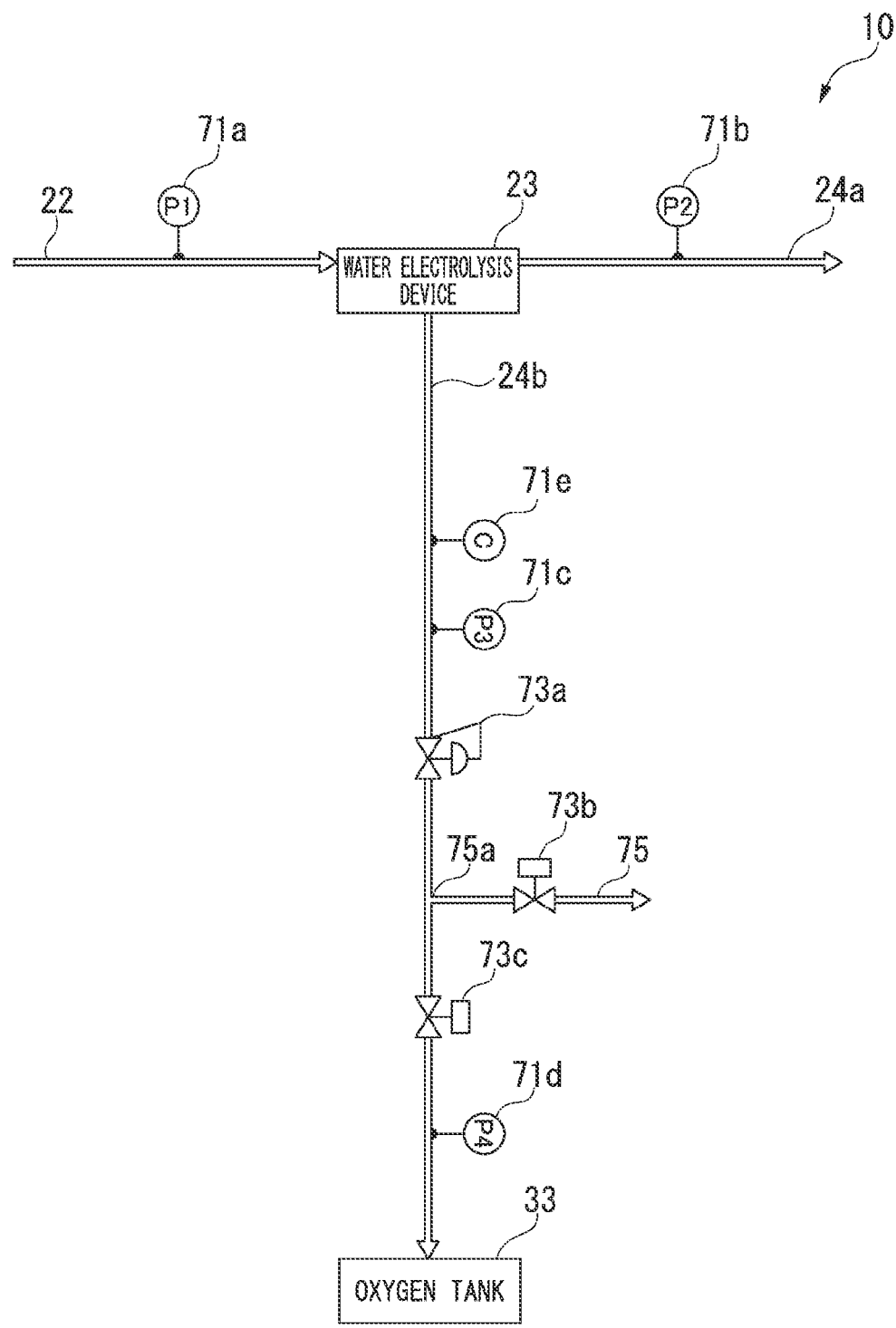
FIG. 3 is a diagram showing an arrangement of a plurality of sensors and a plurality of valves in the water electrolysis system according to the embodiment of the present invention.

FIG. 3 is a diagram showing the arrangement of a plurality of sensors and a plurality of valves in the water electrolysis system 10 of the embodiment.

As shown in FIG. 3, the water electrolysis system 10 includes a plurality of sensors and a plurality of valves.

The plurality of sensors include, for example, a first pressure sensor 71a, a second pressure sensor 71b, a third pressure sensor 71c, a fourth pressure sensor 71d, and a hydrogen concentration sensor 71e.

The plurality of valves include, for example, a back pressure valve 73a, a purge valve 73b, and an opening/closing valve 73c. Each of the plurality of valves is, for example, a solenoid valve, an electric valve, a pneumatic valve, or the like, and an opening/closing operation and an opening degree are controlled by the control device 19.

The first pressure sensor 71a is arranged in the water supply flow path 22. The first pressure sensor 71a detects the pressure (supply water pressure: first pressure P1) of water flowing in the water supply flow path 22 and outputs a signal of a detected value of the first pressure P1.

The second pressure sensor 71b is arranged in the hydrogen supply flow path 24a. The second pressure sensor 71b detects the pressure (second pressure P2) of the unreacted water and the hydrogen fluid flowing in the hydrogen supply flow path 24a and outputs a signal of a detected value of the second pressure P2.

The third pressure sensor 71c is arranged between the water electrolysis device 23 and the back pressure valve 73a to be described below in the oxygen supply flow path 24b. The third pressure sensor 71c detects the pressure (third pressure P3) of the fluid containing oxygen flowing in the oxygen supply flow path 24b and outputs a signal of a detected value of the third pressure P3.

The fourth pressure sensor 71d is arranged between the opening/closing valve 73c to be described below and the oxygen tank 33 in the oxygen supply flow path 24b. The fourth pressure sensor 71d detects the pressure (fourth pressure P4) of oxygen stored in the oxygen tank 33 and outputs a signal of a detected value of the fourth pressure P4.

The hydrogen concentration sensor 71e is arranged between the water electrolysis device 23 and the back pressure valve 73a to be described below in the oxygen supply flow path 24b. A concentration (a hydrogen concentration C) of hydrogen contained in the fluid flowing in the oxygen supply flow path 24b is detected and a signal of a detected value of the hydrogen concentration C is output.

The back pressure valve 73a is arranged between the water electrolysis device 23 in the oxygen supply flow path 24b and the branch portion 75a of the discharge flow path 75 branching from the oxygen supply flow path 24b. The back pressure valve 73a maintains the pressure of a fluid of the water electrolysis device 23 side (i.e., an upstream side) in the oxygen supply flow path 24b at prescribed set pressure in a prescribed reference setting state. In the open state, the back pressure valve 73a allows the flow of a fluid containing oxygen from the oxygen tank 33 side (i.e., a downstream side) to the water electrolysis device 23 side (i.e., the upstream side).

The purge valve 73b is arranged in the discharge flow path 75. The purge valve 73b switches between whether or not to externally discharge a fluid from the oxygen supply flow path 24b via the discharge flow path 75 by switching the opening/closing of the discharge flow path 75.

The opening/closing valve 73c is arranged between the branch portion 75a of the discharge flow path 75 and the fourth pressure sensor 71d in the oxygen supply flow path 24b. The opening/closing valve 73c switches the presence/absence of a flow of a fluid to the back pressure valve 73a side or the oxygen tank 33 side in the oxygen supply flow path 24b by switching the opening/closing of the oxygen supply flow path 24b.

A method of controlling the water electrolysis system 10 in the embodiment, i.e., a control operation executed by the control device 19 will be described below.

Figure 4:
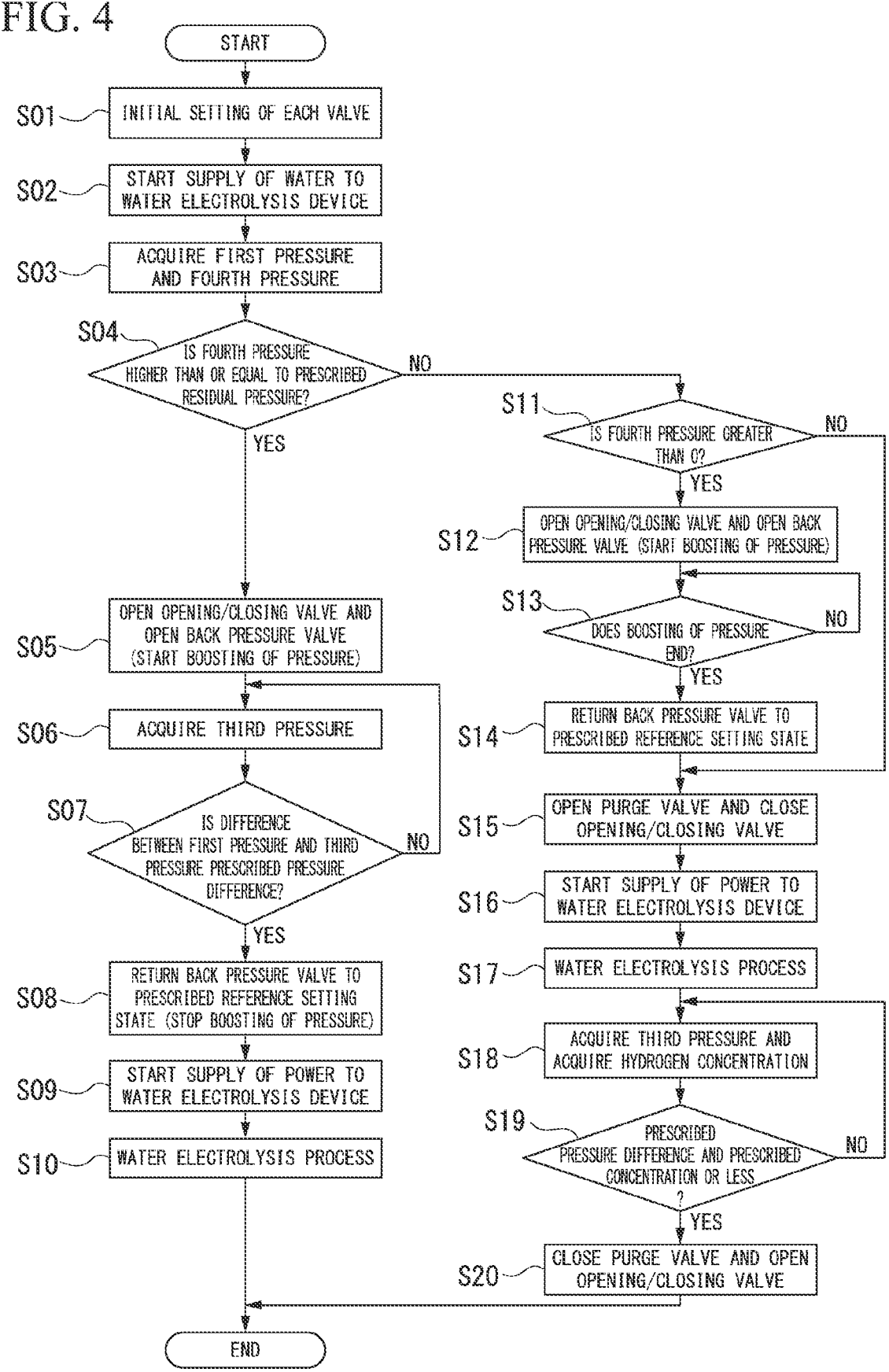
FIG. 4 is a flowchart showing a method of activating the water electrolysis according to the embodiment of the present invention.

FIG. 4 is a flowchart showing a method of activating the water electrolysis device 23 in the embodiment.

As shown in FIG. 4, a series of processing steps from step S01 to step S20 is executed when the water electrolysis device 23 is activated.

First, in step S01, the control device 19 performs an initial setting process for a plurality of valves. For example, the purge valve 73b and the opening/closing valve 73c are in a closed state. The back pressure valve 73a is in a prescribed reference setting state and is in a state in which the pressure of the fluid of the water electrolysis device 23 side (i.e., the upstream side) is maintained at prescribed set pressure for filling the oxygen tank 33 with oxygen. The prescribed set pressure is, for example, about 10 MPa or the like.

Subsequently, in step S02, the control device 19 starts the supply of water from the water supply unit 21 to the water electrolysis device 23 via the water supply flow path 22.

Subsequently, in step S03, the control device 19 acquires the first pressure P1 and the fourth pressure P4 from the first pressure sensor 71a and the fourth pressure sensor 71d.

Subsequently, in step S04, the control device 19 determines whether or not the fourth pressure P4 is higher than or equal to prescribed residual pressure. The prescribed residual pressure is, for example, pressure required to boost the third pressure P3 to pressure that is at least prescribed pressure higher than the first pressure P1 at the time of boosting in step S05 to be described below.

When this determination result is "YES," the control device 19 moves the process to step S05. On the other hand, when this determination result is "NO," the control device 19 moves the process to step S11.

Subsequently, in step S05, the control device 19 starts the supply of oxygen from the oxygen tank 33 to the water electrolysis device 23 by opening the opening/closing valve 73c and opening the back pressure valve 73a. The control device 19 makes the pressure of the anode 53 side of the solid polymer electrolyte membrane 51 in the water electrolysis cell 41 of the water electrolysis device 23 relatively higher than the pressure of the cathode 55 side.

Subsequently, in step S06, the control device 19 acquires the third pressure P3 from the third pressure sensor 71c.

Subsequently, in step S07, the control device 19 determines whether or not the third pressure P3 is at least prescribed pressure higher than the first pressure P1. The prescribed pressure is, for example, 0.1 MPa or more, and is, more preferably, 0.2 MPa or the like in the range of 0.2 MPa to 0.5 MPa.

When this determination result is "YES," the control device 19 moves the process to step S08. On the other hand, when this determination result is "NO," the control device 19 returns the process to step S06.

Subsequently, in step S08, the control device 19 stops the boosting of the pressure of the anode 53 side due to the supply of oxygen from the oxygen tank 33 to the water electrolysis device 23 by returning the back pressure valve 73a to the prescribed reference setting state.

Subsequently, in step S09, the control device 19 starts the supply of power from the power supply 57 of the water electrolysis device 23 to the anode 53 and the cathode 55.

Subsequently, in step S10, the control device 19 executes a process of electrolyzing water in the water electrolysis device 23. The control device 19 makes the pressure of oxygen generated at the anode 53 according to the electrolysis of water in the water electrolysis cell 41 relatively higher than the pressure of hydrogen generated at the cathode 55. The process proceeds to the end.

In step S11, the control device 19 determines whether or not the fourth pressure P4 is greater than zero.

When this determination result is "YES," the control device 19 moves the process to step S12. On the other hand, when this determination result is "NO," the control device 19 moves the process to step S15.

Subsequently, in step S12, the control device 19 starts the supply of oxygen from the oxygen tank 33 to the water electrolysis device 23 by opening the opening/closing valve 73c and opening the back pressure valve 73a. The control device 19 makes the pressure of the anode 53 side of the solid polymer electrolyte membrane 51 in the water electrolysis cell 41 of the water electrolysis device 23 relatively higher than the pressure of the cathode 55 side.

Subsequently, in step S13, the control device 19 determines whether or not the boosting of the pressure of the anode 53 side due to the supply of oxygen from the oxygen tank 33 to the water electrolysis device 23 has been completed.

When this determination result is "YES," the control device 19 moves the process to step S14. On the other hand, when this determination result is "NO," the control device 19 iteratively executes the determination process of step S13.

Subsequently, in step S14, the control device 19 returns the back pressure valve 73a to the prescribed reference setting state.

Subsequently, in step S15, the control device 19 opens the purge valve 73b and closes the opening/closing valve 73c.

Subsequently, in step S16, the control device 19 starts the supply of power from the power supply 57 of the water electrolysis device 23 to the anode 53 and the cathode 55.

Subsequently, in step S17, the control device 19 executes a process of electrolyzing water in the water electrolysis device 23. The control device 19 makes the pressure of oxygen generated at the anode 53 according to the electrolysis of water in the water electrolysis cell 41 relatively higher than the pressure of hydrogen generated at the cathode 55.

Subsequently, in step S18, the control device 19 acquires the third pressure P3 from the third pressure sensor 71c and acquires the hydrogen concentration C from the hydrogen concentration sensor 71e.

Subsequently, in step S19, the control device 19 determines whether or not the third pressure P3 is at least prescribed pressure higher than the first pressure P1 and the hydrogen concentration C is less than or equal to a prescribed concentration. The prescribed pressure is, for example, 0.1 MPa or more, and is, more preferably, 0.2 MPa or the like in a range of 0.2 MPa to 0.5 MPa.

When this determination result is "YES," the control device 19 moves the process to step S20. On the other hand, when this determination result is "NO," the control device 19 returns the process to step S18.

Subsequently, the control device 19 closes the purge valve 73b and opens the opening/closing valve 73c. The process proceeds to the end.

Figure 5:
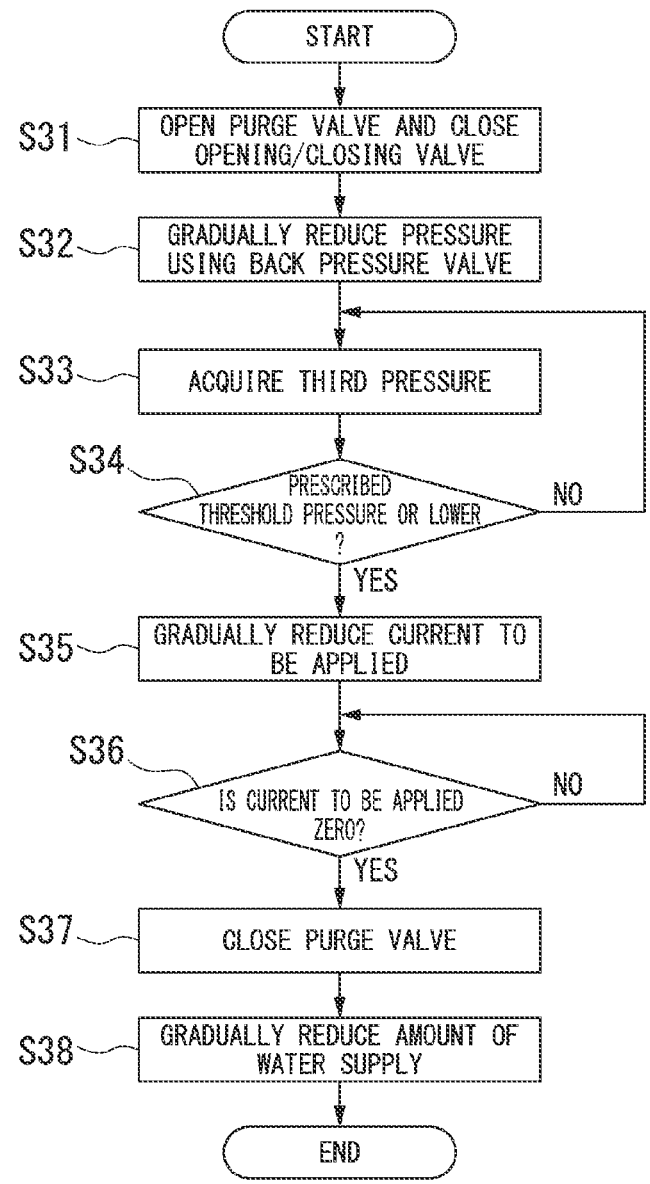
FIG. 5 is a flowchart showing a method of stopping the water electrolysis device according to the embodiment of the present invention.

FIG. 5 is a flowchart showing a method of stopping the water electrolysis device 23 in the embodiment.

As shown in FIG. 5, a series of processing steps from step S31 to step S38 is executed when the water electrolysis device 23 is stopped.

First, in step S31, the control device 19 opens the purge valve 73b and closes the opening/closing valve 73c.

Subsequently, in step S32, the control device 19 gradually reduces the pressure of a fluid of the water electrolysis device 23 side (i.e., the upstream side) by changing the back pressure valve 73a from a prescribed reference setting state to the open state.

Subsequently, in step S33, the control device 19 acquires the third pressure P3 from the third pressure sensor 71c.

Subsequently, in step S34, the control device 19 determines whether or not the third pressure P3 is lower than or equal to a prescribed threshold pressure.

When this determination result is "YES," the control device 19 moves the process to step S35. On the other hand, when this determination result is "NO," the control device 19 returns the process to step S33.

Subsequently, in step S35, the control device 19 gradually reduces an electric current applied from the power supply 57 of the water electrolysis device 23 to the anode 53 and the cathode 55.

Subsequently, in step S36, the control device 19 determines whether or not the electric current applied from the power supply 57 to the anode 53 and the cathode 55 is zero.

When this determination result is "YES," the control device 19 moves the process to step S37. On the other hand, when the determination result is "NO," the control device 19 iteratively executes the determination process of step S36.

Subsequently, in step S37, the control device 19 closes the purge valve 73b.

Subsequently, in step S37, the control device 19 gradually reduces an amount of water supplied from the water supply unit 21 (an amount of water supply) to the water electrolysis device 23. The process proceeds to the end.

As described above, according to the water electrolysis device 23 and a method of controlling the water electrolysis system 10 according to the embodiments, the control device 19 makes the pressure of the anode 53 side of the solid polymer electrolyte membrane 51 relatively higher than the pressure of the cathode 55 side from the time before the start of electrolysis of water. Thereby, it is possible to limit the movement of hydrogen, which is more likely to permeate the solid polymer electrolyte membrane 51 than oxygen, from the cathode 55 side to the anode 53 side due to a difference in a magnitude of molecular weight.

The control device 19 can increase the pressure of the anode 53 side before the start of electrolysis of water due to the oxygen stored in advance in the oxygen tank 33. For example, as compared with the case where the pressure of the anode 53 side is boosted due to the supply of external oxygen, it is possible to limit the complexity of a system configuration without the need to provide dedicated equipment for boosting.

The control device 19 supplies water for electrolysis from the water supply unit 21 to the cathode 55 by a so-called cathode feed, so that it is possible to easily boost the pressure of the anode 53 side, for example, as compared with the case where water for electrolysis is supplied to the anode 53 side.

Modified Examples

Hereinafter, a modified example of the embodiment will be described. Parts that are the same as those in the above-described embodiment are designated by the same reference signs and the description thereof will be omitted or simplified.

Although the control device 19 is supposed to boost the pressure of the anode 53 side due to the supply (backflow) of oxygen from the oxygen tank 33 to the water electrolysis device 23 when the water electrolysis device 23 is activated, the present invention is not limited thereto. In addition to the oxygen tank 33, a tank for boosting may be provided.

Figure 6:
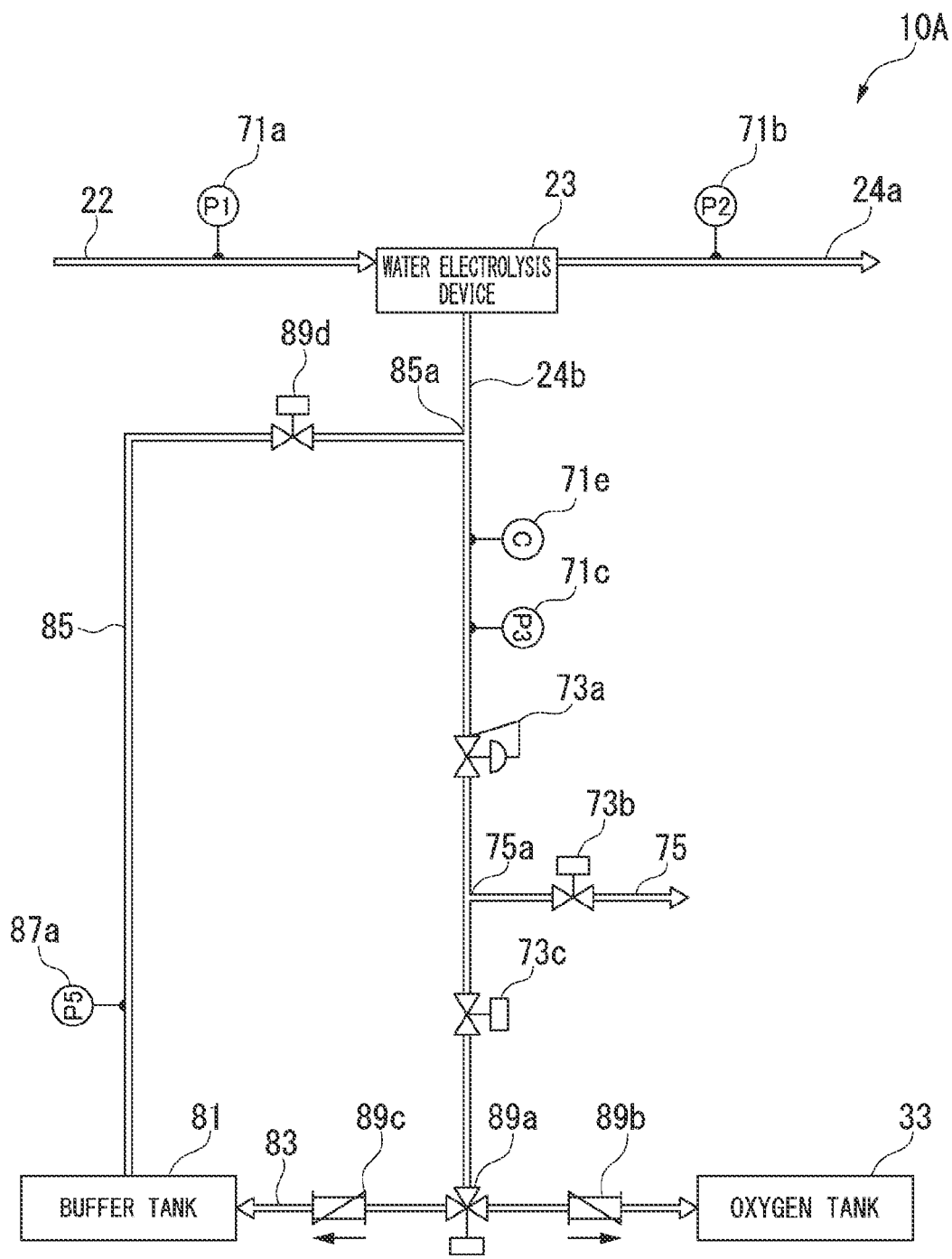
FIG. 6 is a diagram showing an arrangement of a plurality of sensors and a plurality of valves of a water electrolysis system in a modified example of the embodiment of the present invention.

FIG. 6 is a diagram showing an arrangement of a plurality of sensors and a plurality of valves of the water electrolysis system 10A in a modified example of the embodiment.

As shown in FIG. 6, the water electrolysis system 10A of the modified example includes a plurality of sensors, a plurality of valves, and a buffer tank 81.

The buffer tank 81 is, for example, a tank having a smaller capacity than that of the oxygen tank 33. The buffer tank 81 is arranged in a buffer filling flow path 83 that branches between a branch portion 75a of the discharge flow path 75 in the oxygen supply flow path 24b and the oxygen tank 33. The buffer tank 81 is connected to a booster flow path 85 merging with the oxygen supply flow path 24b at a merge portion 85a between the water electrolysis device 23 and the back pressure valve 73a in the oxygen supply flow path 24b.

At the time of filling, the buffer tank 81 is filled with oxygen by a fluid containing oxygen supplied from the oxygen supply flow path 24b via the buffer filling flow path 83. At the time of boosting, the buffer tank 81 supplies oxygen to the merge portion 85a on the water electrolysis device 23 side (i.e., the upstream side) of the back pressure valve 73a in the oxygen supply flow path 24b via the booster flow path 85.

The plurality of sensors include, for example, a first pressure sensor 71a, a second pressure sensor 71b, a third pressure sensor 71c, a hydrogen concentration sensor 71e, and a fifth pressure sensor 87a.

The plurality of valves include, for example, a back pressure valve 73a, a purge valve 73b, an opening/closing valve 73c, a switching valve 89a, a first check valve 89b, a second check valve 89c, and a buffer opening/closing valve 89d. Each of the plurality of valves is, for example, a solenoid valve, an electric valve, a pneumatic valve, or the like, and an opening/closing operation and an opening degree are controlled by the control device 19.

The fifth pressure sensor 87a is arranged between the buffer tank 81 and the merge portion 85a in the booster flow path 85. The fifth pressure sensor 87a detects the pressure (fifth pressure P5) of oxygen stored in the buffer tank 81 and outputs a signal of a detected value of the fifth pressure P5.

The switching valve 89a is arranged on the branch portion of the buffer filling flow path 83 in the oxygen supply flow path 24b. The switching valve 89a switches the flow from the water electrolysis device 23 side (i.e., the upstream side) in the oxygen supply flow path 24b to the oxygen tank 33 side (i.e., the downstream side) or the buffer tank 81 side of the buffer filling flow path 83 and connects the flow thereto.

The first check valve 89b is arranged between the switching valve 89a in the oxygen supply flow path 24b and the oxygen tank 33. The first check valve 89b allows the flow of a fluid from the water electrolysis device 23 side (i.e., the upstream side) to the oxygen tank 33 side (i.e., the downstream side) in the oxygen supply flow path 24b, and prohibits the flow in the reverse direction.

The second check valve 89c is arranged between the switching valve 89a and the buffer tank 81 in the buffer filling flow path 83. The second check valve 89c allows the flow of a fluid from the water electrolysis device 23 side to the buffer tank 81 side in the buffer filling flow path 83 and prohibits the flow in the reverse direction.

The buffer opening/closing valve 89d is arranged between the fifth pressure sensor 87a and the merge portion 85a in the booster flow path 85. The buffer opening/closing valve 89d switches the presence/absence of a flow of a fluid from the buffer tank 81 side to the merge portion 85a side in the booster flow path 85 by switching the opening/closing of the booster flow path 85.

Figure 7:
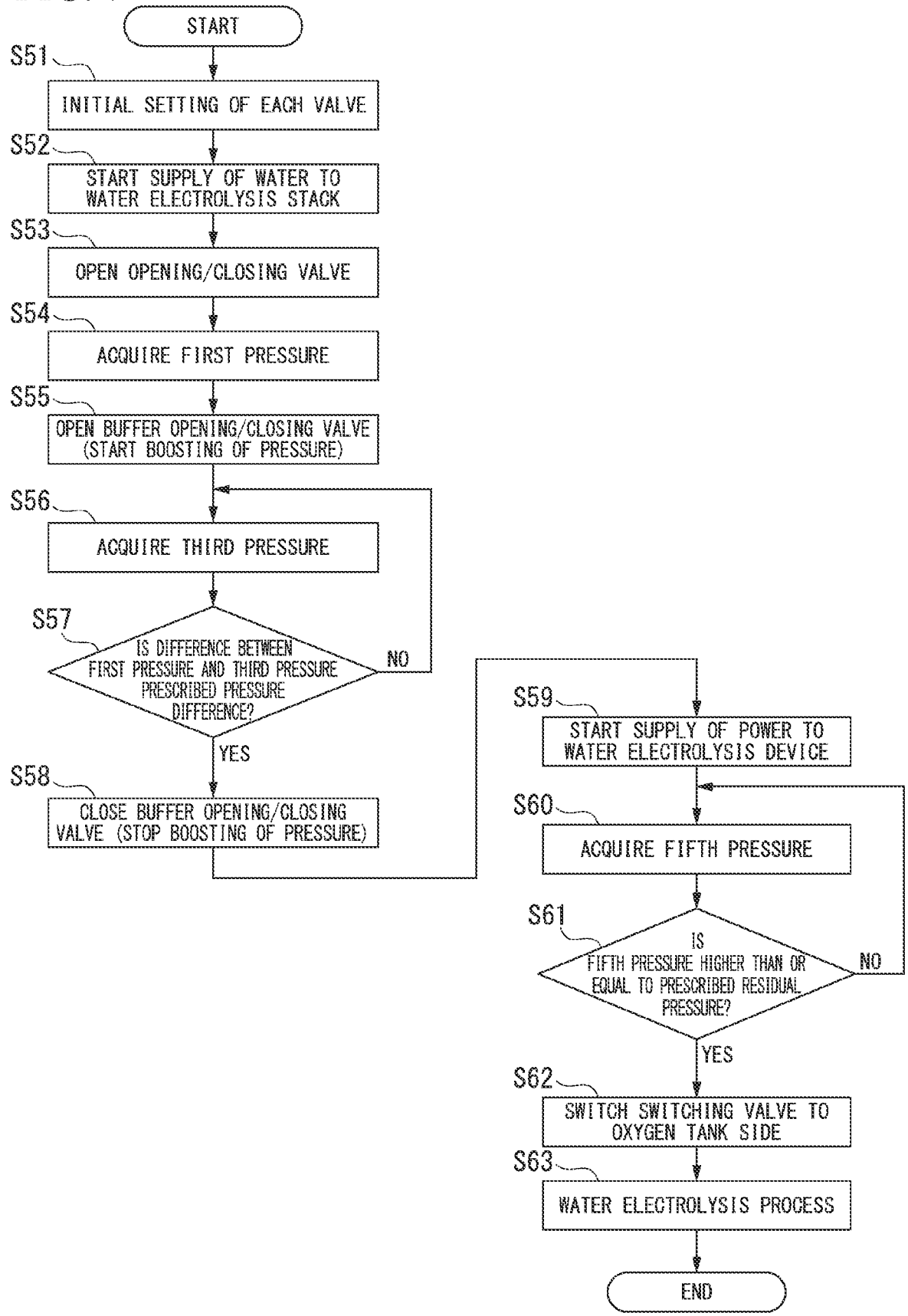
FIG. 7 is a flowchart showing a method of activating a water electrolysis device in a modified example of the embodiment of the present invention.

FIG. 7 is a flowchart showing a method of activating the water electrolysis device 23 in the modified example of the embodiment.

As shown in FIG. 7, a series of processing steps from step S51 to step S63 is executed when the water electrolysis device 23 is activated.

First, in step S51, the control device 19 performs an initial setting process for a plurality of valves. For example, the purge valve 73b, the opening/closing valve 73c, and the buffer opening/closing valve 89d are in the closed state. The back pressure valve 73a is in a prescribed reference setting state and is in a state in which the pressure of the fluid of the water electrolysis device 23 side (that is, the upstream side) is maintained at prescribed set pressure for enabling the buffer tank 81 to be filled with oxygen. The prescribed set pressure is, for example, about 10 MPa or the like. The switching valve 89a is in a state in which the water electrolysis device 23 side (i.e., the upstream side) in the oxygen supply flow path 24b is connected to the buffer tank 81 side.

Subsequently, in step S52, the control device 19 starts the supply of water from the water supply unit 21 to the water electrolysis device 23 via the water supply flow path 22.

Subsequently, in step S53, the control device 19 opens the opening/closing valve 73c.

Subsequently, in step S54, the control device 19 acquires the first pressure P1 from the first pressure sensor 71a.

Subsequently, in step S55, the control device 19 starts the supply of oxygen from the buffer tank 81 to the water electrolysis device 23 via the booster flow path 85 by opening the buffer opening/closing valve 89d. The control device 19 makes the pressure of the anode 53 side of the solid polymer electrolyte membrane 51 in the water electrolysis cell 41 of the water electrolysis device 23 relatively higher than the pressure of the cathode 55 side.

Subsequently, in step S56, the control device 19 acquires the third pressure P3 from the third pressure sensor 71c.

Subsequently, in step S57, the control device 19 determines whether or not the third pressure P3 is at least prescribed pressure higher than the first pressure P1. The prescribed pressure is, for example, 0.1 MPa or more, and is more preferably 0.2 MPa or the like in the range of 0.2 MPa to 0.5 MPa.

When this determination result is "YES," the control device 19 moves the process to step S58. On the other hand, when this determination result is "NO," the control device 19 returns the process to step S56.

Subsequently, in step S58, the control device 19 stops the boosting of pressure of the anode 53 side due to the supply of oxygen from the buffer tank 81 to the water electrolysis device 23 by closing the buffer opening/closing valve 89d.

Subsequently, in step S59, the control device 19 starts the supply of power from the power supply 57 of the water electrolysis device 23 to the anode 53 and the cathode 55.

Subsequently, in step S60, the control device 19 acquires the fifth pressure P5 from the fifth pressure sensor 87a.

Subsequently, in step S61, the control device 19 determines whether or not the fifth pressure P5 is higher than or equal to the prescribed residual pressure. The prescribed residual pressure is, for example, about 9.8 MPa or the like.

When this determination result is "YES," the control device 19 moves the process to step S62. On the other hand, when this determination result is "NO," the control device 19 returns the process to step S60.

Subsequently, in step S62, the control device 19 switches the state to a state in which the water electrolysis device 23 side (i.e., the upstream side) in the oxygen supply flow path 24b is connected to the oxygen tank 33 side by the switching valve 89a.

Subsequently, in step S63, the control device 19 executes a process of electrolyzing water in the water electrolysis device 23. The control device 19 makes the pressure of oxygen generated at the anode 53 according to the electrolysis of water in the water electrolysis cell 41 relatively higher than the pressure of hydrogen generated at the cathode 55. The process proceeds to the end.

According to the above-described modified example, it is possible to increase the pressure of the anode 53 side due to the oxygen supplied from the buffer tank 81 regardless of the residual pressure of the oxygen tank 33 by providing the buffer tank 81 in addition to the oxygen tank 33 configured to store the oxygen generated at the anode 53 according to the electrolysis of water. For example, even if the residual pressure of the oxygen tank 33 is reduced before the start of the electrolysis of the water, the pressure of the anode 53 side can be boosted by the oxygen stored in advance in the buffer tank 81.

The buffer tank 81 is connected to the buffer filling flow path 83 branching from the oxygen supply flow path 24b connecting the water electrolysis device 23 and the oxygen tank 33. Thereby, the oxygen generated at the anode 53 after the start of electrolysis of water can be filled into the buffer tank 81 even if the residual pressure of the buffer tank 81 is reduced due to the boost in the pressure of the anode 53 side before the start of the electrolysis of the water. By maintaining the residual pressure of the buffer tank 81 at a prescribed level or higher, the pressure of the anode 53 side can be accurately boosted at the next activation time.

It is possible to maintain the residual pressure of the buffer tank 81 accurately at a prescribed level or higher by providing the fifth pressure sensor 87a. The control device 19 can limit the excessive supply of oxygen to the buffer tank 81 and efficiently supply the oxygen to the oxygen tank 33 and the buffer tank 81 by switching the supply destination of the oxygen generated at the anode 53 from the buffer tank 81 to the oxygen tank 33 in accordance with the pressure of the oxygen stored in the buffer tank 81.

In the above-described modified example, when the pressure of the anode 53 side of the control device 19 in a state in which oxygen is supplied from the buffer tank 81 to the water electrolysis device 23 before the start of electrolysis of water is lower than prescribed pressure, the control device 19 may be switched to a state in which oxygen is supplied from the oxygen tank 33 to the water electrolysis device 23 as in the above-described embodiment.

In this case, the control device 19 switches an oxygen supply source from the buffer tank 81 to the oxygen tank 33 when the boosting of pressure of the anode 53 side by the buffer tank 81 is insufficient. Thereby, the pressure of the anode 53 side can be increased due to the oxygen supplied from the oxygen tank 33 regardless of the residual pressure of the buffer tank 81. For example, even if the residual pressure of the buffer tank 81 is reduced before the start of electrolysis of water, the pressure of the anode 53 side can be boosted due to the oxygen stored in advance in the oxygen tank 33.

Although the control device 19 opens the purge valve 73b and externally discharges the fluid from the oxygen supply flow path 24b when the hydrogen concentration C acquired from the hydrogen concentration sensor 71e is greater than a prescribed concentration in the above-described embodiment, the present invention is not limited thereto.

For example, the control device 19 may fill the oxygen tank 33 with oxygen obtained by removing hydrogen from the fluid of the oxygen supply flow path 24b by adsorbing hydrogen or the like.

While embodiments of the present invention have been described, these embodiments have been presented by way of example only, and are not intended to limit the scope of the inventions. These embodiments may be embodied in a variety of other forms. Various omissions, substitutions, and changes may be made without departing from the spirit of the inventions. The inventions described in the accompanying claims and their equivalents are intended to cover such embodiments or modifications as would fall within the scope and spirit of the inventions.

What is claimed is:

1. A water electrolysis system comprising:
   a water electrolysis cell having an electrolyte membrane and an anode and a cathode provided on both sides of the electrolyte membrane in a thickness direction and configured to electrolyze water by applying a voltage between the anode and the cathode;
   a power supply configured to apply the voltage between the anode and the cathode;
   an oxygen supply source configured to supply oxygen to the anode; and
   a control device configured to make the pressure of oxygen generated at the anode relatively higher than the pressure of hydrogen generated at the cathode according to the electrolysis of water in the water electrolysis cell and to make the pressure of the anode side of the electrolyte membrane relatively higher than the pressure of the cathode side by supplying the oxygen from the oxygen supply source to the anode before the electrolysis starts.

2. The water electrolysis system according to claim 1, wherein the oxygen supply source includes an oxygen container configured to store oxygen generated at the anode according to the electrolysis of the water by the water electrolysis cell.

3. The water electrolysis system according to claim 1, comprising a first oxygen container configured to store at least a part of oxygen generated at the anode according to the electrolysis of the water by the water electrolysis cell, wherein the oxygen supply source includes a second oxygen container connected to a flow path branching from a flow path for connecting the water electrolysis cell and the first oxygen container and configured to store a part of the oxygen generated at the anode according to the electrolysis of the water by the water electrolysis cell.

4. The water electrolysis system according to claim 3, comprising a pressure acquisition unit configured to acquire the pressure of the oxygen in the second oxygen container, wherein the control device preferentially supplies oxygen generated at the anode after the start of the electrolysis to the second oxygen container over the first oxygen container and switches a supply destination of oxygen generated at the anode from the second oxygen container to the first oxygen container on the basis of the pressure acquired by the pressure acquisition unit.

5. The water electrolysis system according to claim 3, wherein the control device switches the oxygen supply source from the second oxygen container to the first oxygen container when the pressure of the anode side is less than prescribed pressure in a state in which the oxygen is supplied from the second oxygen container to the anode.

6. The water electrolysis system according to claim 1, comprising a water supply unit configured to supply the water to the cathode.

* * * * *